Sept. 4, 1934.  P. M. BOURDON  1,972,678
GUIDE FLANGE FOR RAIL VEHICLES
Filed June 30, 1933
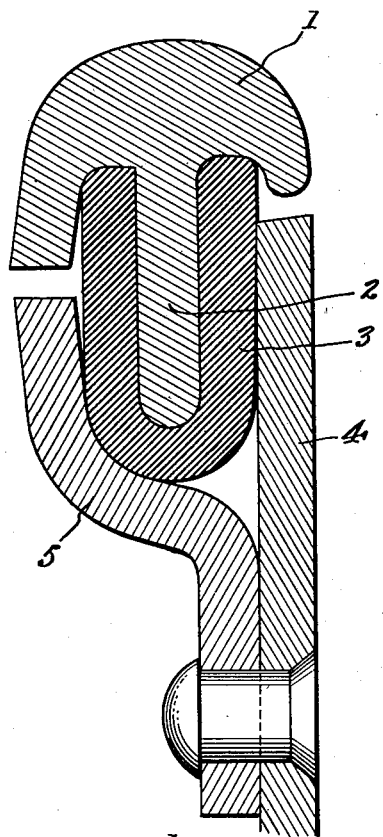
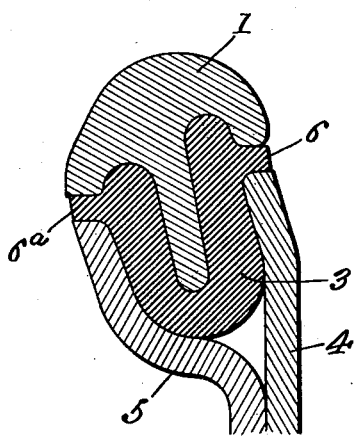
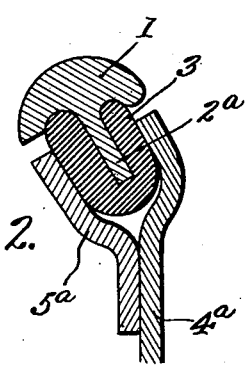
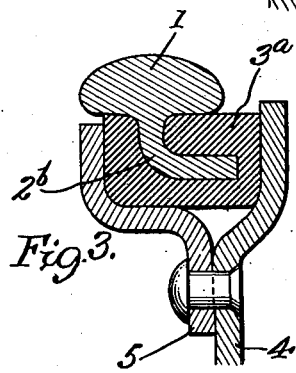
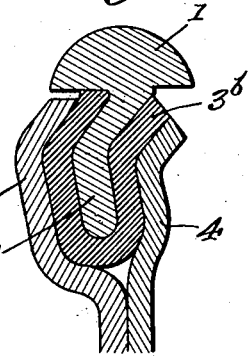
Inventor
Pierre Marcel Bourdon
By Wilkinson & Mawhinney
Attorneys.

Patented Sept. 4, 1934

1,972,678

UNITED STATES PATENT OFFICE 1,972,678

GUIDE FLANGE FOR RAIL VEHICLES

Pierre Marcel Bourdon, Paris, France, assignor to Michelin et Cie, Clermont-Ferrand, France, a corporation of France Application June 30, 1933, Serial No. 678,523
In France July 27, 1932

5 Claims. (Cl. 295—7)

The present invention relates to improvements in guide flanges for the wheels of rail vehicles.

The invention will be found particularly useful in connection with buses traveling on rails or so-called rail cars.

It has been heretofore proposed to use guide flanges constructed to deaden to some extent the noise of the friction of the wheel flange against the rail; and such arrangements are based on the absorption of the vibrations by a vibration absorbent material placed between the flange and its support.

The present invention has for an object to produce an improved construction of such flanges which will possess numerous advantages over the existing types of flanges.

In particular, according to the invention, the form and construction of the flange will allow of maintaining a constant and correct cross section possessing rigidity, and the manufacture of which will be made easy. Such cross section will impart great rigidity in both vertical and lateral directions.

A further object of the invention resides in providing an improved guide flange which is so constructed that it may be made of wear resisting metal without difficulty in manufacture.

The construction will be such as to enable the flange to be replaced very easily and rapidly without the use of special tools.

In accordance with the invention, the improved flange is constructed in the form of a ring in cross section having an integral rib of such cross section that the ring possesses the form of a mushroom; or, in other words, is similar to a rail in construction, the rib being the shank or web of the rail. Such rib is covered by a body or a material adapted to absorb vibrations, such for example as rubber, bakelite, leather, paper, rag pulp, etc.

With the foregoing and other objects in view the invention will be described more particularly hereinafter and will be pointed out in detail in the appended claims.

In the drawing, in which like symbols refer to like or corresponding parts throughout the several views, Figure 1 is a cross sectional view taken through a portion of a wheel and showing the improved flange construction and, Figures 2, 3, 4 and 5 are similar views showing modified forms of the invention.

Referring more particularly to Figure 1, 1 shows the flange construction according to the invention. This flange 1 is constructed with a rib 2 which may be integral with the head 1 of the flange or made separately and attached thereto by any suitable means. The rib 2 serves as an attaching means between the flange 1 and the wheel part.

The flange 1, 2 is in the form of a ring and it may be made in any appropriate manner, for example by rolling or drop forging.

The rib 2 is encased in an appropriate body 3 of vibration absorbing material, preferably arranged in the form of a U. The flange assembly is secured to the circumference of the wheel 4 by a ring 5. Such ring 5 is attached to the wheel 4 in any appropriate manner, for example by riveting or bolting. The ensemble 1, 2, 3 will be maintained in place, the anti-vibration material 3 being compressed between the wheel 4 and the ring 5. To mount and demount the guide flange it will only be necessary to remove the ring 5 as by undoing the rivets or bolts by which such ring 5 is attached to the wheel. The ring 5 may be easily manufactured by rolling or otherwise. The flange 1 may be made of wear resisting substances for instance, chrome nickel steel, manganese steel, stainless steel, etc. The form of the outer part of the flange is determined by the corresponding form of the rail and such form may vary as shown in the different figures. Also the attaching rib 2 may be modified to any desired form. The body of absorbent material 3 will likewise be modified in form to conform to the various constructions of the ribs.

For instance, in Figures 1 and 2 the material 3 simply encloses the rib 2. In Figure 2 the material 3 may be thicker on the lower side of the rib due to the inclination in order to carry the heavier weight. The material 3 may be folded about the rib 2 or the rib 2 may be embedded in the plastic material 3.

In each figure the form of the elements 4 and 5 is changed somewhat as a result of different forms of material.

In the example shown in Figure 2, the rib $2^a$ is inclined, the periphery of the wheel element $4^a$ and the ring $5^a$ being similarly inclined.

In Figure 3 the rib $2^b$ is bent so that it is made up of both vertical and horizontal parts. The body $3^a$ is of substantially rectangular form, or is similar to a block in which the rib $2^b$ is embedded.

In Figure 4 the rib $2^c$ is bent angularly at an intermediate portion to form angled parts which are diagonal to the vertical. The U-shaped absorbent body 3b embraces this angled portion and partakes of the angular character thereof.

The absorbent material, instead of simply embracing the sides of the rib may be provided with extensions as seen at 6 and 6a in Figure 5, whereby to prevent contact of the flange 1 with the metal of the elements 4 and 5.

The improved flange has the advantage of providing a strong, solid cross section at the circumference portion of the wheel which insures the lateral rigidity of the wheel, absorbs noise and vibration and contributes to the safety and comfort of the passengers.

I do not wish to be restricted to the precise details of construction shown and described, as it is obvious that various changes and modifications might be made within the scope of the invention and I reserve the right to all such modifications which are within the scope of the following claims.

What is claimed is:

1. In combination with a wheel, a removable ring attached to the side of the wheel, a wheel guiding flange having a rib extending between the side of the wheel and said ring, and a pad of vibration absorbent material bent into substantially U-shape about the rib and extending in contact at its outer portions with the side of the wheel and the interior portion of said ring.

2. In combination with a wheel, a plate removably attached to the side of the wheel inwardly of its peripheral part and having an outer portion offset from the plane of the wheel, a rail guiding flange consisting of a head and a rib projecting inwardly from the head, and a body of vibration absorbent material lying in approximately U-form in cross section about the rib and engaging also the offset portion of said ring and the adjacent side face of the wheel.

3. In combination with a wheel, a mushroom shaped rail guiding flange including a rib extending inwardly from the head of the flange and lying in spaced relation alongside the outer peripheral part of said wheel, a pad of vibration absorbent material lying on both sides of said rib and interposed between said rib and fastening means demountably attached to the wheel body and having a part engaging the absorbent material at the outer side of the rib.

4. In combination with a wheel, a wheel guiding flange consisting of a head and a rib extending inwardly of the head and in spaced relation beside the outer peripheral part of said wheel, a substantially U-shaped pad of vibration absorbent material extending about and on both sides of said rib and having an inner connecting portion, and a plate secured to the side of the wheel body with a seat to receive the connecting part of the absorbent material and an outer offset part for compressing the pad laterally towards the adjacent face of the wheel body.

5. In combination with a wheel and fastening means thereon, a rail guiding flange having a head with lugs projecting inwardly towards the periphery of said wheel and the outer edge of said fastening means, a rib projecting from the intermediate portion of said head inwardly beyond said lugs and lying between the fastening means and the adjacent side of said wheel body, and a pad of vibration absorbent material extending about said rib and provided with projecting portions lying between said lugs and the wheel body and fastening means respectively.

PIERRE MARCEL BOURDON.